US011150122B2

(12) United States Patent
Griessbaum et al.

(10) Patent No.: US 11,150,122 B2
(45) Date of Patent: Oct. 19, 2021

(54) FILL LEVEL REFLECTOMETER HAVING REFERENCE REFLECTION

(71) Applicant: VEGA Grieshaber KG, Wolfach (DE)

(72) Inventors: Karl Griessbaum, Muehlenbach (DE);
Roland Welle, Hausach (DE);
Bernhard Corbe, Schutterwald (DE)

(73) Assignee: VEGA Grieshaber KG, Wolfach (DE)

( * ) Notice: Subject to any disclaimer, the term of this patent is extended or adjusted under 35 U.S.C. 154(b) by 241 days.

(21) Appl. No.: 16/011,274

(22) Filed: Jun. 18, 2018

(65) Prior Publication Data

US 2018/0372527 A1 Dec. 27, 2018

(30) Foreign Application Priority Data

| Jun. 21, 2017 | (DE) | 10 2017 210 381.7 |
| Jun. 21, 2017 | (DE) | 10 2017 210 382.5 |
| Jun. 21, 2017 | (DE) | 10 2017 210 383.3 |
| Jun. 21, 2017 | (DE) | 10 2017 210 402.3 |
| Jun. 21, 2017 | (EP) | 17177111 |
| Jun. 21, 2017 | (EP) | 17177147 |

(51) Int. Cl.
*G01F 23/284* (2006.01)
*G01S 7/40* (2006.01)
(Continued)

(52) U.S. Cl.
CPC ........ *G01F 23/284* (2013.01); *G01F 23/0061* (2013.01); *G01F 23/0076* (2013.01);
(Continued)

(58) Field of Classification Search
CPC ............. G01F 23/284; G01F 23/0061; G01F 23/0076; G01F 25/0061; G01S 13/88;
(Continued)

(56) References Cited

U.S. PATENT DOCUMENTS

| 4,044,354 A | 8/1977 | Bosher et al. |
| 4,044,355 A | 8/1977 | Edvardsson |

(Continued)

FOREIGN PATENT DOCUMENTS

| CN | 1041654 A | 4/1990 |
| CN | 1234509 A | 11/1999 |

(Continued)

OTHER PUBLICATIONS

T. Saito, et al., "An FM-CW radar module with front-end switching heterodyne receiver", IEEE MTT-S Digest, T-2, vol. 2, XP032363243A, 1992, pp. 713-716.

(Continued)

*Primary Examiner* — Olumide Ajibade Akonai
(74) *Attorney, Agent, or Firm* — Oblon, McClelland, Maier & Neustadt, L.L.P.

(57) ABSTRACT

A fill level radar device is provided, including two at least partially different signal source assemblies for heterodyne mixing of the received reflected signal of the filling material surface with a second signal in order to create an intermediate frequency signal having a uniform frequency that does not depend on the frequency of the first signal.

10 Claims, 6 Drawing Sheets

(51) Int. Cl.
  *G01F 23/00* (2006.01)
  *G01S 13/34* (2006.01)
  *G01S 13/88* (2006.01)
  *H01Q 1/22* (2006.01)
  *H01Q 13/02* (2006.01)

(52) U.S. Cl.
  CPC ........... *G01S 7/4008* (2013.01); *G01S 7/4013* (2021.05); *G01S 13/34* (2013.01); *G01S 13/88* (2013.01); *H01Q 1/225* (2013.01); *H01Q 13/02* (2013.01)

(58) Field of Classification Search
  CPC .......... G01S 13/103; G01S 7/35; G01S 13/08; G01S 13/34; G01S 7/003; G01S 7/282; G01S 7/285
  See application file for complete search history.

(56) References Cited

U.S. PATENT DOCUMENTS

| | | | |
|---|---|---|---|
| 4,210,023 A | 7/1980 | Sakamoto et al. | |
| 4,503,433 A | 3/1985 | Tomasi | |
| 4,661,817 A | 4/1987 | Bekkadal et al. | |
| 4,847,623 A | 7/1989 | Jean | |
| 5,406,842 A | 4/1995 | Locke | |
| 5,440,310 A | 8/1995 | Schreiner | |
| 5,629,706 A | 5/1997 | Bååth | |
| 6,107,957 A * | 8/2000 | Cramer | G01F 23/284 342/124 |
| 6,122,602 A | 9/2000 | Michalski et al. | |
| 6,486,826 B1 | 11/2002 | Cramer et al. | |
| 6,684,696 B2 | 2/2004 | Schultheiss | |
| 6,864,833 B2 | 3/2005 | Lyon | |
| 7,363,812 B2 | 4/2008 | Eriksson | |
| 7,460,057 B2 | 12/2008 | Fehrenbach | |
| 8,276,444 B2 | 10/2012 | Malinovskiy | |
| 8,319,680 B2 | 11/2012 | Sae | |
| 8,497,799 B2 | 7/2013 | Kleman | |
| 8,872,694 B2 | 10/2014 | Edvardsson et al. | |
| 9,291,443 B2 | 3/2016 | Kleman et al. | |
| 9,329,074 B2 | 5/2016 | Sai | |
| 9,389,113 B2 | 7/2016 | Jirskog et al. | |
| 9,395,229 B2 | 7/2016 | Jirskog et al. | |
| 9,506,796 B2 | 11/2016 | Edvardsson | |
| 9,541,444 B2 | 1/2017 | Kleman | |
| 9,793,951 B2 | 10/2017 | Henry | |
| 10,260,928 B2 | 4/2019 | Welle | |
| 10,310,056 B2 | 6/2019 | Hughes | |
| 10,416,021 B2 * | 9/2019 | Gorenflo | G01F 25/0061 |
| 10,422,682 B2 | 9/2019 | Hengstler | |
| 10,473,509 B2 | 11/2019 | Hengstler | |
| 10,623,009 B2 * | 4/2020 | Mayer | H03L 7/099 |
| 2005/0052314 A1 * | 3/2005 | Spanke | G01F 23/284 342/124 |
| 2005/0166671 A1 | 8/2005 | Peterson et al. | |
| 2005/0168379 A1 | 8/2005 | Griessbaum | |
| 2006/0044145 A1 | 3/2006 | Akerstrom | |
| 2008/0282793 A1 | 11/2008 | Jirskog | |
| 2009/0033543 A1 | 2/2009 | Nilsson | |
| 2011/0163910 A1 | 7/2011 | Sai | |
| 2011/0248725 A1 | 10/2011 | Mukherjee | |
| 2012/0130509 A1 | 5/2012 | Altendorf | |
| 2012/0169528 A1 | 7/2012 | Edvardsson et al. | |
| 2012/0242530 A1 | 9/2012 | Luebbert et al. | |
| 2012/0242538 A1 * | 9/2012 | Hasch | G01S 7/354 342/194 |
| 2012/0299767 A1 | 11/2012 | Kleman | |
| 2012/0299768 A1 | 11/2012 | Griessbaum | |
| 2013/0213132 A1 | 8/2013 | Wegemann | |
| 2014/0253147 A1 | 9/2014 | Kleman et al. | |
| 2014/0253366 A1 | 9/2014 | Kleman | |
| 2014/0298885 A1 * | 10/2014 | Criel | G01F 23/00 73/1.73 |
| 2015/0116142 A1 | 4/2015 | Jirskog | |
| 2015/0160066 A1 | 6/2015 | Sai | |
| 2015/0177163 A1 | 6/2015 | Edvardsson | |
| 2015/0253176 A1 | 9/2015 | Jirskog et al. | |
| 2015/0276462 A1 | 10/2015 | Kleman | |
| 2015/0338261 A1 | 11/2015 | Mueller | |
| 2016/0103006 A1 | 4/2016 | Edvardsson | |
| 2016/0115784 A1 | 4/2016 | Littleford et al. | |
| 2016/0146658 A1 | 5/2016 | Littleford | |
| 2018/0031687 A1 | 2/2018 | Mueller | |
| 2018/0136323 A1 * | 5/2018 | Pozdniakov | G01S 13/88 |
| 2018/0164145 A1 | 6/2018 | Daufeld et al. | |
| 2018/0262319 A1 | 9/2018 | Xing | |
| 2018/0328771 A1 * | 11/2018 | Edvardsson | G01F 23/284 |
| 2020/0249068 A1 * | 8/2020 | Michalski | G01S 13/88 |

FOREIGN PATENT DOCUMENTS

| | | |
|---|---|---|
| CN | 101140180 A | 3/2008 |
| CN | 101322015 A | 12/2008 |
| CN | 101485074 A | 7/2009 |
| CN | 101492750 A | 7/2009 |
| CN | 101666668 A | 3/2010 |
| CN | 202382811 U | 8/2012 |
| CN | 102763001 A | 10/2012 |
| CN | 102798436 A | 11/2012 |
| CN | 103017868 A | 4/2013 |
| CN | 104713617 A | 6/2015 |
| CN | 104897242 A | 9/2015 |
| CN | 1113003 A | 10/2015 |
| CN | 104977063 A | 10/2015 |
| CN | 105102942 A | 11/2015 |
| CN | 205037943 U | 2/2016 |
| DE | 694 33 175 T2 | 6/2004 |
| DE | 102009057191 A1 | 6/2011 |
| DE | 10 2015 109 463 A1 | 12/2016 |
| EP | 0 928 974 A2 | 7/1999 |
| EP | 1 707 982 A1 | 10/2006 |
| EP | 1 707 983 A1 | 10/2006 |
| EP | 1 992 922 A2 | 11/2008 |
| EP | 1 992 923 A2 | 11/2008 |
| EP | 2 166 671 A2 | 3/2010 |
| EP | 2 293 096 A2 | 3/2011 |
| EP | 2 293 096 A3 | 3/2011 |
| EP | 2 631 612 A2 | 8/2013 |
| EP | 2 491 355 B1 | 12/2017 |
| JP | 2013-253937 A | 12/2013 |
| KR | 10-2015-0126532 A | 11/2015 |

OTHER PUBLICATIONS

Office Action dated May 15, 2020 in U.S. Appl. No. 16/014,501, 9 pages.
Office Action dated Jul. 9, 2020 in U.S. Appl. No. 16/008,456, 15 pages.
Office Action dated Oct. 6, 2020 in co-pending U.S. Appl. No. 16/014,680, 11 pages.
Office Action dated Aug. 28, 2020 in co-pending U.S. Appl. No. 16/014,634, 23 pages.
Notice of Allowance dated Sep. 3, 2020 in co-pending U.S. Appl. No. 16/014,501, 11 pages.
Combined Chinese Office Action and Search Report dated Mar. 24, 2021 in Chinese Patent Application No. 20180629191.6 (with English translation of Office Action), 16 pages.
Combined Chinese Office Action and Search Report dated Mar. 22, 2021 in Chinese Patent Application No. 201810643215.3 (with English translation of Office Action), 15 pages.
Combined Chinese Office Action and Search Report dated Mar. 24, 2021 in Chinese Patent Application No. 201810642348.9 (with English translation and English summary of Office Action), 21 pages.
Combined Chinese Office Action and Search Report dated Mar. 26, 2021 in Chinese Patent Application No. 201810643156.X (with English translation and English summary of Office Action), 16 pages.
Combined Chinese Office Action and Search Report dated Mar. 23, 2021 in Chinese Patent Application No. 201810646168.8 (with (56) References Cited

OTHER PUBLICATIONS

English translation and English summary of Office Action), 19 pages.

Notice of Allowance dated Feb. 3, 2021 in co-pending U.S. Appl. No. 16/014,634, 17 pages.

No author given, "Rosemount Guided Wave Radar Transmitters in Upstream Applications: Best Practices User Guide"; Reference Manual 00809-0600-4811, Rev. AA; Feb. 2009; published by Rosemount Measurement, Chanhassen, MN, USA. (Year: 2009).

No author given, "Rosemount 5300 Series: Commissioning and Validation Procedures for Rosemount Radar"; Reference Manual 00809-1600-4530, Rev. AA; Mar. 2015; published by Rosemount Measurement, Chanhassen, MN, USA. (Year: 2015).

* cited by examiner

FILL LEVEL REFLECTOMETER HAVING REFERENCE REFLECTION

CROSS-REFERENCE TO RELATED APPLICATIONS

This application claims the benefit of the filing date of European Patent Applications No. 17 177 111.6, filed on 21 Jun. 2017, and No. 17 177 147.0 filed on 21 Jun. 2017, the entire contents of each of which are hereby incorporated herein by reference, and of German Patent Applications No. 10 2017 210 383.3, filed on 21 Jun. 2017, No. 10 2017 210 381.7, filed on 21 Jun. 2017, No. 10 2017 210 382.5, filed on 21 Jun. 2017, and No. 10 2017 210 402.3, filed on 21 Jun. 2017, the entire contents of each of which are hereby incorporated by reference.

FIELD

The invention relates to the technical field of fill level measurement. In particular, the invention relates to a fill level radar device, also referred to as a fill level reflectometer, which determines the fill level from the delay time of electromagnetic waves, which are emitted from the measurement device and received again after reflection on the filling material. The invention further relates to a method for fill level determination, a program element and a computer-readable medium.

BACKGROUND

The present invention is used in the field of fill level measurement devices, and in particular relates to fill level measurement devices that determine the fill level from the delay time of electromagnetic waves which are transmitted from the measurement device and received again after reflection on the filling material. A distance between the measurement device and the filling material can be determined from the delay time of the waves and from said distance a degree of filling of a container equipped with the measurement device can in turn be determined.

The electromagnetic waves may be high-frequency waves or microwaves. Said waves can be emitted into free space from the measurement device in the direction of the filling material or alternatively be guided there and back by a waveguide.

Various measurement methods are known for measuring the delay time of electromagnetic waves between transmission and reception. In principle, these are methods which measure the delay time of very short transmission pulses, mostly referred to as pulse radar, and methods which are based on the modulation of continually transmitted signals. These methods, which are known as CW (continuous-wave) radar, transmit continuously throughout the duration of a measurement procedure, whereby the transmission duration, in contrast to pulse methods, is typically orders of magnitude longer than the delay time of the signals within a measurement procedure.

Figure 2:
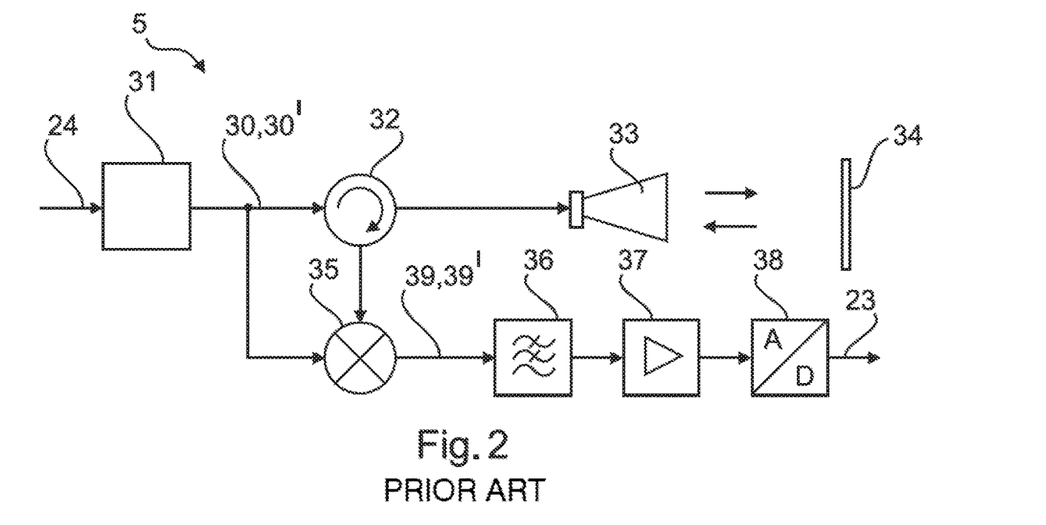
FIG. 2 shows the design of sensor electronics of a fill level radar device.

The delay time can be indirectly determined in the process by modulating the transmission and reception waves. In the FMCW (frequency-modulated continuous-wave) method, linear frequency modulation is used for this purpose. FIG. 2 shows the fundamental design of a transceiver circuit 5 of an FMCW radar sensor in the form of a highly simplified block diagram. The synthesiser 31 is used to generate the transmission signal 30 and for this purpose comprises a VCO (voltage-controlled oscillator), for example. The frequency of the transmission signal is modulated linearly by means of a circuit comprised in the synthesiser 31 for controlling the transmission frequency, for example a PLL (phase locked loop) circuit. Said transmission signal 30 arrives at the antenna 33 via the circulator 32 and is transmitted from said antenna towards the reflector 34. The reception signal returning to the antenna 33 subsequent to reflection arrives at the mixer 35 via the circulator 32. Said mixer mixes the reception signal with part of the transmission signal, producing a beat signal 39. Said beat signal is digitalised by an analogue-to-digital converter 38 and then further processed digitally after low-pass filtering in the filter 36 and corresponding amplification in the amplifier 37. The mixing of the transmission and reception signals, which come from the same signal source 31, is a homodyne receiver principle.

Figure 3:
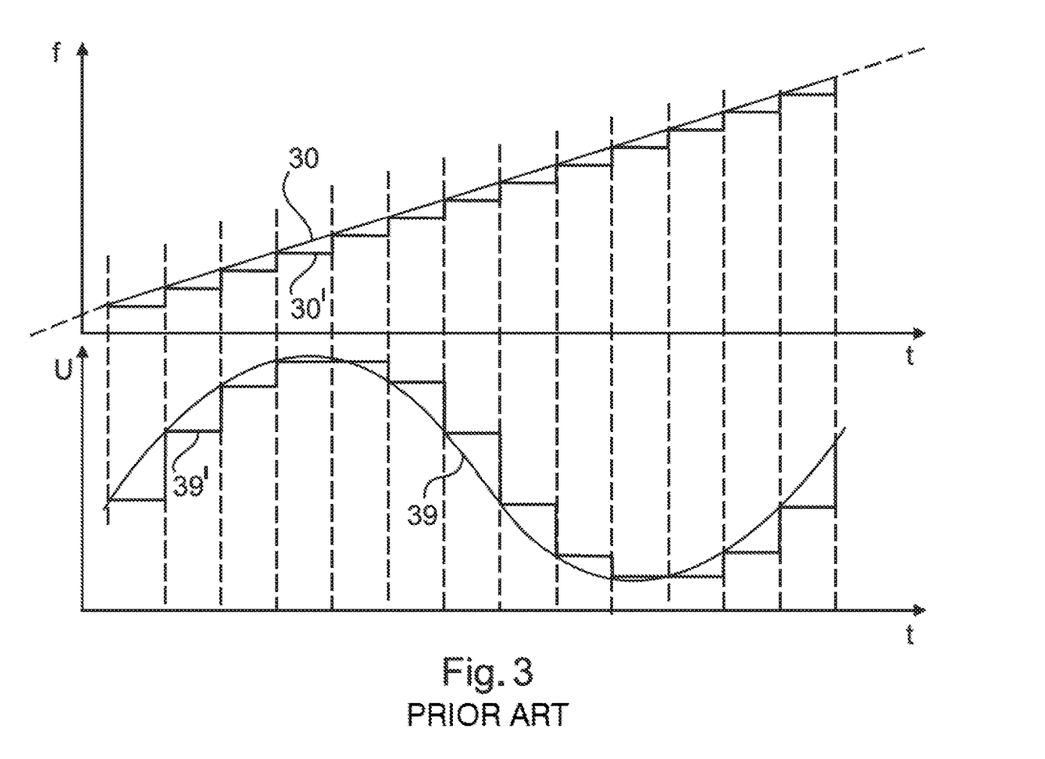
FIG. 3 shows two variants of an FMCW method.

The distance of the reflector 34 from the measurement device has a direct effect on the frequency of the beat signal 39, which is why, conversely, conclusions can be drawn directly on the measurement distance on the basis of the measured beat frequency. In the case of a plurality of reflectors, a beat signal 39 is produced having a frequency mixture of individual signals associated with the various measurement distances. It is therefore usual for the digitalised beat signal to be subjected to spectral analysis using a Fourier transform, for example a fast Fourier transform (FFT), in order to separate the individual frequency portions or reflection portions and optionally to accurately determine said components with regard to the frequency thereof and thus the underlying measurement distance. FIG. 3 shows a portion of the transmission signal 30 having the linear frequency modulation in a time-frequency diagram, and directly therebelow, in a time-voltage diagram, an example of an associated analogue beat signal 39 which is produced at a defined reflector distance.

A known variant of the FMCW method is changing the linear frequency modulation of the transmission signal to a stepped linear frequency modulation, as shown in FIG. 3 as the alternative 30'. In this case, the transmission signal 30' remains at a particular frequency for a certain period of time and then jumps in equal increments to the next frequencies. By means of the homodyne mixing according to the block diagram from FIG. 2, which is also applicable here, a direct voltage resulting from the mutual phase shift of the transmission and reception signal is produced for each frequency step. The direct voltages resulting from each step produce, when placed in succession, a signal curve 39' in accordance with the beat frequency 39 of the previously described FMCW method. This is also shown schematically in FIG. 3 in part. As is clear from the figure, the previously continuous beat signal 39 is converted into a stepped analogue signal 39'. When said stepped signal 39' is subsequently converted from analogue to digital, naturally there is the possibility of converting precisely one sample value per step, whereby the digitalised beat signal of the stepped linear frequency modulation does not differ substantially from the digitalised beat signal of a standard FMCW method. Therefore, the further digital signal processing, starting with the Fourier transform, is identical in both methods.

Although fill level measurement devices based on the above-mentioned previously known methods for measuring the delay time of electromagnetic waves are currently already very sophisticated and efficient, improvements are nevertheless possible. Said improvements may for example relate to higher signal sensitivity, higher measurement accuracy or better adaptation of the measurement device to the relevant use.

SUMMARY

The present disclosure describes providing an alternative method to the previous methods which allows fill level measurement using electromagnetic waves in an advantageous manner.

A described embodiment relates to a fill level radar device or fill level reflectometer comprising a first signal source assembly and a second signal source assembly or circuit. The first signal source assembly is used to generate a first electromagnetic signal having a partially constant frequency, the individual frequencies being distributed within a defined frequency band. The second signal source assembly is used to generate a second electromagnetic transmission signal. A transmission assembly, for example in the form of an antenna for contactless measurement or in the form of a waveguide, is provided for emitting the first signal towards a filling material surface and for receiving the first signal reflected on the filling material surface. Furthermore, a mixer arrangement or circuit is provided for heterodyne mixing of the received reflected first signal with the second signal in order to create an intermediate frequency signal having a uniform frequency that does not depend on the frequency of the first signal. Furthermore, the fill level radar device comprises an evaluation circuit for determining a fill level from the intermediate frequency signal.

Heterodyne mixing means that two different signal source assemblies are provided which allow the signals from different signal source assemblies to be used in order to generate the intermediate frequency signal. In contrast hereto, homodyne mixing involves mixing two signals that come from the same signal source or signal source assembly. The signals are for example the transmission signal, which is delivered to the mixer directly by the signal source assembly, and the reception signal, which is the transmission signal reflected by the filling material.

According to a described embodiment, the evaluation circuit comprises a first circuit arrangement for determining a complex reflection coefficient from the intermediate frequency signal, for example in the form of magnitude and phase or in the form of real and imaginary parts. According to another embodiment, the evaluation circuit comprises a second circuit arrangement for creating a value table from the partially constant frequencies of the first signal and the associated complex reflection coefficients.

The constant frequencies of the first signal are emitted in succession and the complex reflection coefficient related to said frequencies is determined for each of the constant frequencies. The value table therefore comprises a value group for each constant frequency consisting of a frequency value and the associated complex reflection coefficient.

The fill level can then be unambiguously determined from the various value groups by means of an inverse Fourier transform.

According to another described embodiment, the second circuit arrangement is designed to carry out an inverse Fourier transform of the value table from the frequency range into the time range and to subsequently determine the fill level from the transformed value table.

According to another described embodiment, the second signal source assembly comprises a signal source for generating a signal having a constant frequency.

According to another described embodiment, the second signal has a partially constant frequency, which frequency has a constant frequency offset to the frequency of the first electromagnetic signal.

According to another described embodiment, the individual frequencies of the first signal are distributed equidistantly to one another within a frequency band. In the case of cable-guided probes, said frequency band is, for example, between 1 GHz and 5 GHz and has a width of, for example, 3 GHz. In the case of fill level radar devices that radiate into free space, the frequency band is, for example, between 70 and 80 GHz at a width of approximately 10 GHz.

Higher frequencies, in particular, or lower frequencies may also be provided. According to another described embodiment, a reference reflector is provided, the evaluation circuit being designed to use the first signal reflected on the reference reflector as the time and/or amplitude reference during fill level determination. A more exact correction of the amplitudes and distances of the reflections measured by means of the antenna is therefore possible.

According to another described embodiment, a method is provided for determining the fill level, in which method a first electromagnetic signal having a partially constant frequency is generated, the individual frequencies being distributed within a defined frequency band. Simultaneously, a second electromagnetic signal is generated by another signal source assembly. The first signal is transmitted towards a filling material surface and the first signal reflected on the filling material surface is received again by the measurement device. Subsequently, heterodyne mixing of the received reflected first signal with the second signal is carried out in order to create an intermediate frequency signal having a uniform frequency that does not depend on the frequency of the first signal. Both signals come from at least partially different signal source assemblies. The fill level is then determined from the intermediate frequency signal, which as a general rule involves an inverse fast Fourier transform.

According to an embodiment, the method comprises the following features:

Successive emission of a plurality of electromagnetic waves having defined, partially fixed frequencies within a defined frequency band, the individual frequencies being distributed over the band.

Heterodyne mixing, upon reception, of signals that are reflected and received again in order to produce a uniform intermediate frequency that does not depend on the transmission frequency set.

Filtering and amplification of the intermediate frequency signal in order to suppress interfering signal components outside the range of the intermediate frequency.

Determination of a complex reflection coefficient in the form of magnitude and phase or in the form of real and imaginary parts, on the basis of the intermediate frequency signal.

Creation of a digital value table consisting of the above-mentioned frequency values and associated complex reflection coefficients.

Implementation of an inverse Fourier transform in order to transform said value table into a corresponding digital value table consisting of time values and associated reflection characteristic values.

Evaluation of the resulting time-based reflection profile in order to identify the reflection of the filling material surface.

Determination of the time value of the filling material reflection and conversion of said time value into a reflector distance on the basis of the previously known wave propagation speed.

Calculation of a value of the degree of filling from the previously known container height, the distance of the sensor from the container and the previously determined reflector distance.

Another advantageous feature of the method is the use of a reference reflection (distance reference and/or amplitude reference), which results for example from reflection on a coupling/antenna. This could also be a circulator leakage signal, the reflection on an internal permanent reference or the signal of a switchable reference or a separate reference channel.

A further described embodiment relates to a program element which, when executed on an evaluation circuit of a fill level radar device, instructs the fill level radar device to carry out the steps described above and in the following.

A last described embodiment relates to a computer-readable medium, on which the above-described program element is stored.

A core aspect of the invention can be considered to be the use of an alternative fill level radar method which provides for the determination of reflection coefficients on a plurality of frequencies distributed equidistantly over a frequency band. Moreover, another advantageous feature is the use of a reference reflection.

BRIEF DESCRIPTION OF THE DRAWINGS

In the following, embodiments are described with reference to the drawings. In the following drawings, like reference signs denote like or similar elements. The views in the drawings are schematic and not to scale.

DETAILED DESCRIPTION OF EMBODIMENTS

Figure 1:
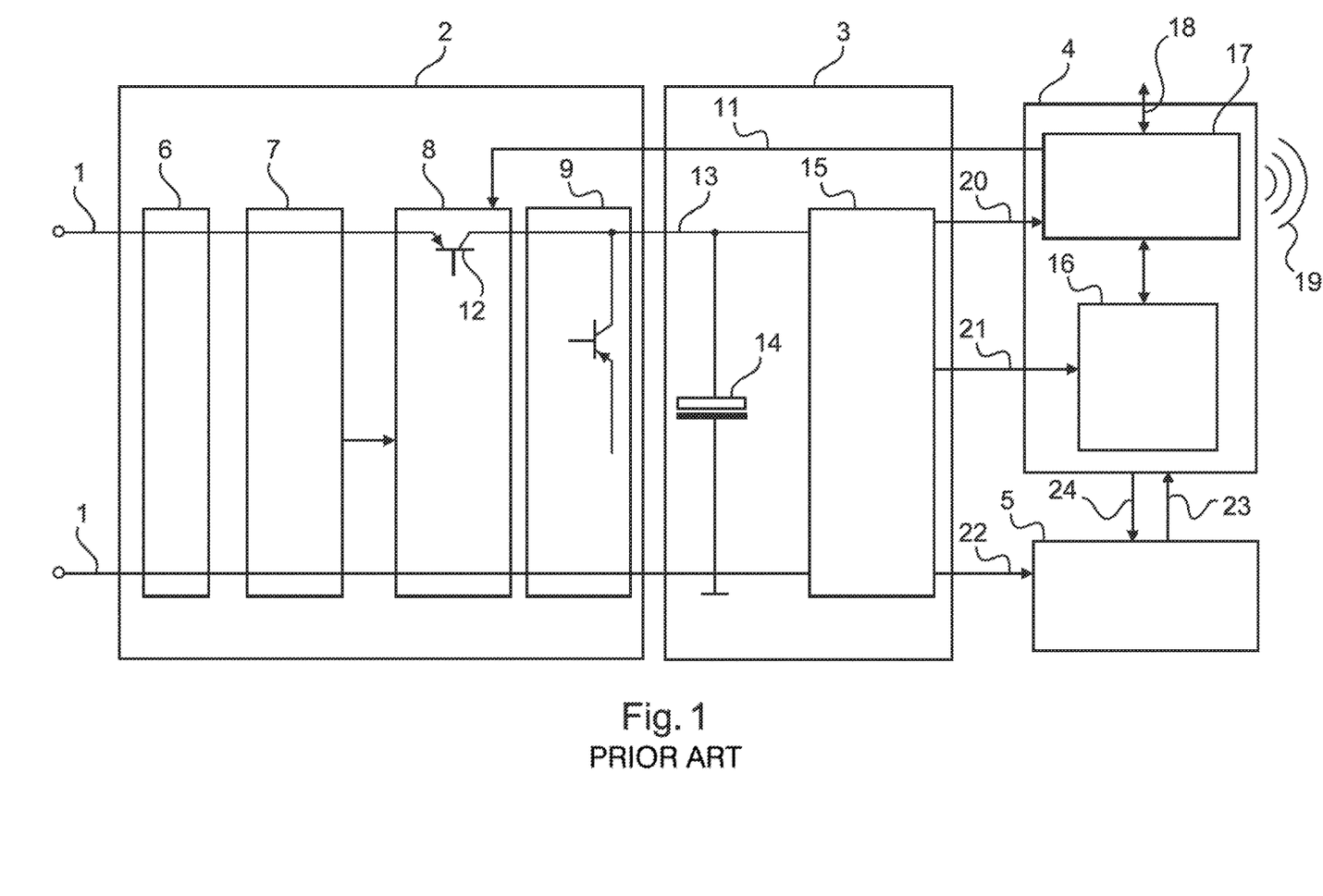
FIG. 1 shows the design of a fill level radar device.

FIG. 1 shows the fundamental design of a radar fill level sensor as is widely known from the prior art. In this case, the radar sensor is a two-wire radar sensor, which is supplied with energy and signals the measurement value to the outside via the two-wire loop 1. In the present block diagram, said radar sensor is initially divided up into the four essential blocks thereof: two-wire interface 2, power pack 3, control and measurement value processing circuit 4, and transceiver circuit 5. The two-wire interface 2 contains an EMV filter circuit 6 for filtering out interfering signals, a current-sensing circuit 7 for determining the current presently flowing in the current loop, a current regulation circuit 8, and a shunt circuit 9. The current regulation circuit 8 compares the present actual value 10 of the regulation detected by the current-sensing circuit 7 with the target value 11 provided by the control and measurement value processing circuit 4, and regulates the loop current by means, for example, of a transistor 12 connected in series such that the target and actual values correspond. The current flowing at the output 13 of the current regulator 8 supplies the power pack 3, said current being divided into a charging current for the energy store 14 and an operating current for the DC-DC converter 15. If the energy store 14 is fully charged and if less power is momentarily required by the DC-DC converter 15 than the two-wire loop outputs to the sensor, the remaining current flows back through the shunt circuit 9 to the source (not shown).

The control and measurement value processing circuit 4 monitors the measurement procedure within the sensor, determines a measurement value from the sensor signals of the transceiver circuit 5 in the form of a degree of filling of a container, and communicates the measurement value to the outside. For this purpose, said control and measurement value processing circuit comprises a controller circuit 16 and a communication and interface circuit 17. The controller circuit 16 consists for example of a microcontroller having corresponding peripheral equipment. The communication and interface circuit 17 delivers the measurement value to be output to the current regulation circuit 8 in analogue or digital form as a target value 11 and can comprise various other channels 18, 19 in addition thereto for communication with people or other devices. Said communication can take place both via wires 18 and via radio 19.

The transceiver circuit 5 contains all the microwave circuits that are necessary for transmitting and receiving the high-frequency electromagnetic waves of the radar sensor. Said circuit also contains circuit components for processing and converting the reception signal, such that said signal is accessible as an output signal 23 in the digital form of the signal processing of the controller circuit 16. The controller circuit 16, for its part, controls the transceiver circuit 5 via control lines 24 in that said controller circuit repeatedly initiates, monitors and evaluates individual measurement cycles and terminates said measurement cycles by updating the measurement value. All components of the control and measurement value processing circuit 4 and of the transceiver circuit 5 of the radar sensor are provided via regulated output voltages 20, 21, 22 of the DC-DC converter 15.

Figure 4:
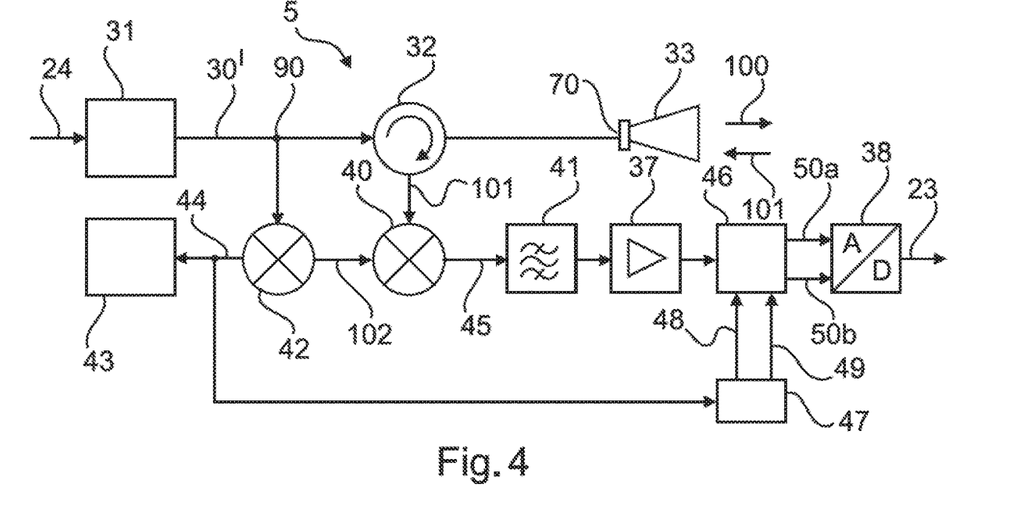
FIG. 4 shows the design of a transceiver circuit according to an embodiment.
Figure 5:
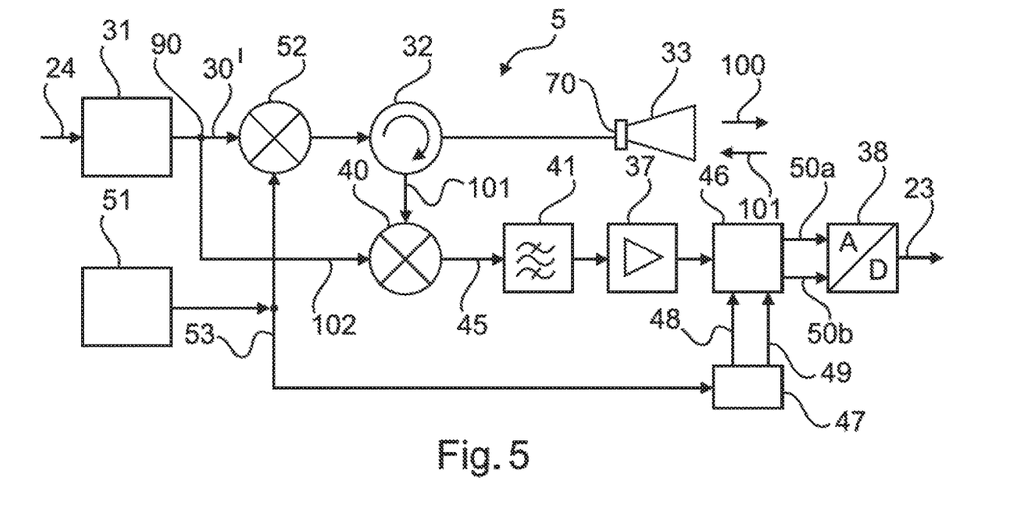
FIG. 5 shows the design of a transceiver circuit according to another embodiment.
Figure 6:
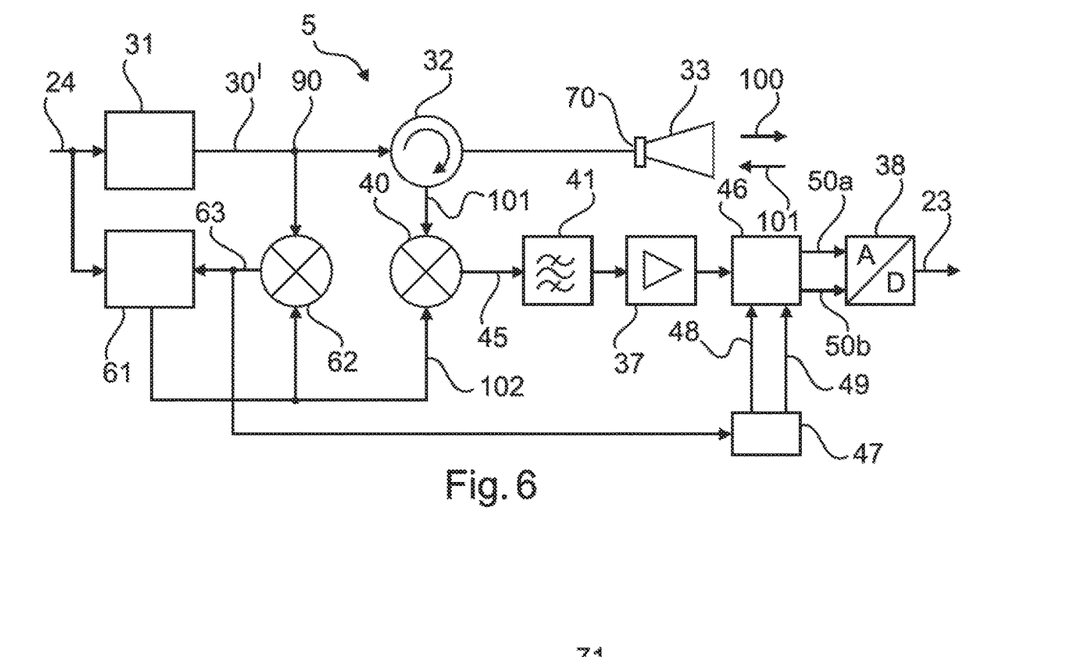
FIG. 6 shows the design of a transceiver circuit according to another embodiment.

FIG. 4 to FIG. 6 are block diagrams of transceiver circuits 5 which can alternatively be used in radar fill level sensors according to the described embodiments. Said sensors contain partly the same components, which are therefore provided with the same reference signs.

The embodiments according to FIGS. 4 and 5 have the advantage of a simpler circuit design, since only fixed-frequency oscillators 43 or 51 are necessary.

The output frequencies arising during mixing by means of the mixers 42 or 52 are closer together and therefore the frequency which is intended to be filtered out as the useful frequency requires a more elaborate band-pass filter. (Example for FIG. 4: Transmission frequency 1 GHz, oscillator frequency 10 MHz, resulting mixer output frequencies are, inter alia, 0.99 GHz, 1 GHz, 1.01 GHz; only the frequency 0.99 GHz, for example, is intended to be used as the local oscillator for the mixer 40).

This is avoided by means of the more elaborate circuit design according to FIG. 6 (example for FIG. 6: Transmission frequency 1 GHz, output frequency synthesiser 61 1.01 GHz, resulting output frequencies of the mixer 62 are, inter alia, 10 MHz, 1 GHz, 1.01 GHz, 2.01 GHz; the output frequency 10 MHz is used).

The transceiver circuit 5 according to FIG. 2 for implementing the known FMCW method comprising homodyne reception mixing has already been explained in the introduction.

FIGS. 4 to 6 show possible circuit designs in the form of simplified block diagrams for implementing the method according to the described embodiments. The heterodyne circuit design is common to all three block diagrams, which design provides for reception mixing of the received signal with the local oscillator signal of a different frequency, such that an intermediate frequency is produced at the mixer output.

In FIG. 4, a transmission signal is generated by the synthesiser 31, which signal is conveyed via the circulator 32 or directional coupler 32 to the antenna 33 and emitted therefrom. In the process, the antenna 33 converts a high-frequency signal delivered via a line into an electromagnetic wave 100, which is either emitted into free space or alternatively is guided towards the reflector via a waveguide, for example a hollow conductor or a single-wire or multi-wire conductor. The wave 101 reflected on the reflector (filling material surface) arrives back at least in part at the antenna 33 and is converted back into a line-guided reception signal. Said reception signal arrives at the receiving mixer 40 via the circulator or directional coupler 32.

The circulator or directional coupler 32 is a component part that is known in the field of radar fill level measurement and that can advantageously be used in monostatic operation, i.e., when using the same antenna for transmission and reception. Said circulator or directional coupler comprises three ports and conveys signals from one port primarily to a second port in a directionally selective manner, whereas the third port is decoupled in this case. In bistatic operation (also possible but not shown here), two separate antennae are used for transmission and reception. In this case, the circulator or directional coupler 32 is dispensed with and the signal on the one hand arrives at the transmission antenna from the synthesiser 31 and on the other hand arrives at the receiving mixer 40 from the reception antenna.

The synthesiser 31 is used to generate various sine waves of various discrete frequencies. For this purpose, the synthesiser contains a tunable oscillator, for example a VCO (voltage-controlled oscillator). Moreover, said synthesiser advantageously contains a control loop and a reference oscillator. The control loop, for example a phase-locked loop (PLL), regulates the frequency of the tunable oscillator in such a way that said frequency is in a particular, adjustable ratio to the frequency of the reference oscillator.

The frequency ratio is advantageously adjusted digitally, for example in a manner controlled by the control circuit 16, said adjustment primarily involving switching one or more divider components, which divide down the frequency of the reference oscillator and/or of the tunable oscillator. In this case, in addition to simple integral dividers, non-integral dividers, so-called fractional N dividers, are also possible. By using dividers of this kind, it is possible to adjust the output frequency of the synthesiser 31 in very small steps over a relatively large frequency range.

Part of the output signal of the synthesiser 31 branches off at the junction 90, for example via a power splitter or a coupler (not shown in further detail), in order to form the local oscillator signal for the receiving mixer 40. For this purpose, the branched-off synthesiser signal 30' is mixed with an output signal 44 of a fixed-frequency oscillator 43 by means of the mixer 42, as a result of which various new frequency portions, such as the sum frequency and difference frequency, are produced from the two input frequencies. Both input frequencies could optionally be used as the above-mentioned local oscillator signal of the receiving mixer 40 subsequent to corresponding band-pass filtering (not shown here). The difference frequency, inter alia, of the local oscillator signal and reception signal is produced from said local oscillator signal and reception signal in the receiving mixer 40, which difference frequency thus corresponds exactly to the output frequency of the fixed-frequency oscillator 43. Said output signal 45 of the receiving mixer 40, referred to as the intermediate frequency signal, in addition to the above-mentioned fixed frequency, has a phase position that defines, together with the amplitude of the intermediate frequency signal, a complex characteristic variable of the reflection coefficient of all the reflectors participating in the reflection of the wave. Or in other words, the phase position of the intermediate frequency signal depends on the mutual phase position of the local oscillator signal and the reception signal. The phase position of the reception signal, for its part, depends on the distance traveled by the transmitted or received wave and thus on the reflector distance, whereas the phase position of the local oscillator signal depends on the synthesiser output signal and thus on the transmitted signal. Therefore, the phase position of the intermediate frequency signal is ultimately only dependent on the phase shift between the transmission signal and the reception signal and thus on the reflector distance.

In the circuit portion 37, said intermediate frequency signal 45 is band-pass-filtered and if necessary amplified, in order to increase the signal-to-noise ratio. Different variants are possible for determining the complex reflection coefficient from the analogue intermediate frequency signal. Firstly, direct digitalisation of the filtered and amplified intermediate frequency signal is possible by means of sampling and analogue-to-digital conversion, such that the subsequent digital determination of phase and amplitude of the intermediate frequency signal directly supplies the desired amplitude and phase of the complex reflection coefficient. This variant is not shown in FIG. 4.

Secondly, the filtered and amplified intermediate frequency signal can be split into the complex constituents thereof, i.e., the real part 50a and the imaginary part 50b, by using a quadrature demodulator 46, and subsequently both portions are separately converted from analogue to digital. For this purpose, another part 48 of the output signal 44 of the fixed-frequency oscillator 43 and also a signal 49 that is phase-shifted by 90° with respect to said signal are additionally to be supplied to the quadrature demodulator 46, which phase-shifted signal is generated in the phase shifter 47. An advantage of the use of the quadrature demodulator is that the real and imaginary part of the intermediate frequency signal are present as baseband signals 50a, 50b, i.e., no more high frequency portions are contained and are thus very easy to digitalise.

As already indicated, the measurement values are further processed inside the measurement value processing circuit 4 subsequent to the analogue-to-digital conversion by means of the converter 38. Said circuit contains, for example, a controller circuit 16 including the entire required peripheral equipment, in particular a non-volatile and volatile memory. The circuit portion 16 also contains a program code for controlling the sequence of a measurement cycle, i.e., for initiating the emission of the waves and the control of the frequencies, and the digitalisation of the measurement values.

The circuit arrangement shown in FIG. 4 makes it possible, as described, to determine a complex reflection coefficient at a particular output frequency of the synthesiser 31. Said complex reflection coefficient is composed of all reflection portions that are contained in the received signal. If a plurality of reflectors are involved, the individual signal portions can no longer be separated and determination of the distance of the individual reflectors is no longer possible. However, if said measurement is repeated at additional adjusted output frequencies within a particular frequency band, a digital value table consisting of the adjusted frequency values and the associated complex reflection coefficients can be created. Advantageously, the frequency distances of all frequency values are selected to be equal, such that the frequency values divide the frequency band into equidistant portions. The band-limited spectrum of the digital reflection coefficients produced in this way is then subjected to an inverse Fourier transform, for example at equidistant frequency distances of an IFFT (inverse fast Fourier transform), which transforms the frequency signal into a time signal. Said digital time signal is in turn characteristic for the sum of the reflections of the emitted and re-received measurement signal. Said digital time signal is present in the form of a value table of time values and associated reflection portions and can be evaluated with regard to the detection of local maxima. Said local maxima characterise the individual reflections of the various reflectors that were received after the allotted time. In this form, said time-reflection amplitude value table is identical to the common digitalised reflection profiles from the known fill level radar methods. Further evaluation steps for determining the desired echo of the filling material surface and the determination of the exact reflection time of said echo can therefore be adopted from the known methods of pulse radar or FMCW radar systems. It is therefore advantageous, for example, to save the existing reflections as interference echoes when the filling material container is as empty as possible in order to thus facilitate recognition of the echo of the filling material surface.

The block diagram in FIG. 5 contains many elements from FIG. 4 that are provided with the same reference signs. Said block diagram differs from that of FIG. 4 in that the frequency of the output signal 30' of the synthesiser 31 in the mixer 52 is increased or reduced by a constant amount by adding the signal of the fixed-frequency oscillator 51. The receiving mixer 40 in this case forms the difference frequency from the reception signal and the signal 30' of the synthesiser 31, which in this case is the local oscillator signal of the mixer 40. The resulting intermediate frequency signal 45 at the output of the receiving mixer 40 therefore has, as in the case of the arrangement from FIG. 4, the fixed frequency of the fixed-frequency oscillator, in this case of the oscillator 51.

FIG. 6 shows another variant using the heterodyne receiver principle. Said variant differs from the block diagrams described previously in that instead of the fixed-frequency oscillator 43 or 51, a second synthesiser 61 is present. Said second synthesiser is, in principle, composed of the same functional units as the synthesiser 31 already described. The mixer output signal 63 of the mixer 62, as opposed to the output frequency of the synthesiser 61, is used as the controlled variable and forms the difference frequency between the two synthesisers. Said difference frequency is settled to a specific value by means of the control loop of the synthesiser 61. Since the receiving mixer 40 forms the intermediate frequency signal 45 having the same difference frequency, said frequency is constant, as in FIGS. 4 and 5.

With regard to the block diagrams, it should be noted that they are reduced to the essential components and that some components required for the practical implementation have been omitted or simplified, since they are known to a person skilled in the art. This relates, for example, to filtering measures at the output of the mixers for letting through only the desired mixing frequencies and suppressing undesired mixing products. Moreover, it is common for a person skilled in the art to amplify signals if required at various points on the signal chain in order to increase the signal-to-noise ratio. These could for example be amplifiers in the transmission branch or in the reception branch ahead of the receiving mixer. Moreover, only the part of the sensor circuit that is important for the direct measuring technique is shown. A fill level radar sensor designed according to this principle obviously contains additional circuit components, such as a power pack for voltage supply and circuit parts for communicating the measured fill level value to a superordinate process control station, for example.

An advantageous development of a fill level radar sensor designed according to said principle provides for the use of a reference reflection. Changes over the operating time or operating temperature of the sensor that have a negative influence on the measurement value can therefore be eliminated. All analogue circuit parts in the transmitter and receiver, such as the mixer, amplifier and filter, exhibit a particular temperature dependency in terms of their behaviour. Therefore, the measured complex reflection coefficients are not constant over the temperature with regard to amplitude and phase. In order to be able to correct changes thus produced in the reflection amplitudes and reflection times of the reflection profile, generating and evaluating a previously known reflection of a reference reflector is of advantage. The transition from the antenna feed line to the antenna is suitable as such, for example; see reference sign 70 in FIGS. 4 to 6. Since the impedances of the antenna feed line and the antenna are usually not quite matched with one another, an initially undesired reflection is produced at this point. However, this reflection can be used as the reference reflection, which functions as the time and amplitude reference within the reflection profile. All subsequent echoes within the echo profile can be related to the reference echo simultaneously present in the profile with regard to the delay time of said subsequent echoes, such that instead of an absolute delay time, a time difference between the reference echo and the filling material echo to be measured can be determined. In the same way, temperature-induced amplitude changes can be corrected by scaling the amplitude of the reference reflection to a previously known value and applying the same scaling value to all other amplitudes.

Instead of the reflection at the transition to the antenna, the small portion of the transmission signal is also suitable as the reference reflection, which small portion directly arrives at the receiving mixer 40 from the synthesiser 31 via the circulator or directional coupler 32 on the path that is not possible in the case of the ideal circulator or directional coupler but that is still present in the case of real component parts. Likewise, it is also suitable to incorporate a defined reflection point between the circulator 32 and the antenna 33, for example in the form of an impedance change at a point on the high-frequency line used for this purpose.

Figure 7:
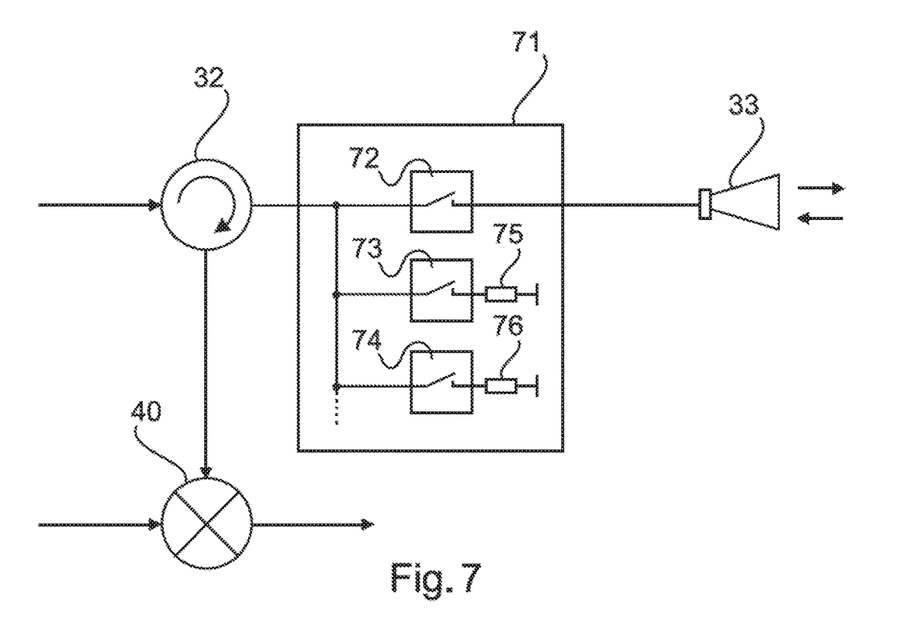
FIG. 7 shows part of a transceiver circuit comprising a switching unit according to an embodiment.

Furthermore, it is suitable to incorporate a switching unit 71 in the line between the circulator 32 and the antenna 33, as shown in part in FIG. 7. The block diagram shown in FIG. 7 is limited to the region between the circulator 32 and the antenna 33. The components not shown can be designed according to the block diagrams from FIG. 4 to FIG. 6. The switching unit 71 contains at least one high-frequency switch 72 and in a first operating state, in a manner controlled by the microcontroller 16, switches the transmission signal from the circulator through to the antenna, while the remaining high-frequency switches 73, 74 and possibly other high-frequency switches (not shown here) are open.

In a second operating state, the switching unit 71 conveys the signal coming from the circulator 32 to an impeder 75 instead of to the antenna. For this purpose, the high-frequency switch 73 is closed, whereas all other switches 72, 74 are open. As a result, a reference reflection is produced at the impeder 75, which reference reflection arrives back at the circulator and from there arrives back at the receiving mixer 40. The impeder 75 may in principle be any impeder, however preferably a short circuit or open-circuit operation. Furthermore, it may also be advantageous to switch on an impeder 76 by means of an additional switch 74 and, if required, as indicated in FIG. 7, to switch on further impeders using further switches, in order to switch, for example, short circuit reflections and open-circuit operation reflections and matched impedances to the line coming from the circulator in the various switch positions. A more exact correction of the amplitudes and distances of the reflections measured by means of the antenna 33 is possible on account of the measurement and evaluation of various reference reflections. In contrast with the above-described variants, in the variant comprising the switch, at least one separate reference measurement cycle using a different switch position for determining the reference information is always required. This is advantageous in that in the "normal" switch position, a reflection profile for recording the filling material reflection cannot be disrupted by a superposed reference reflection.

Figure 8:
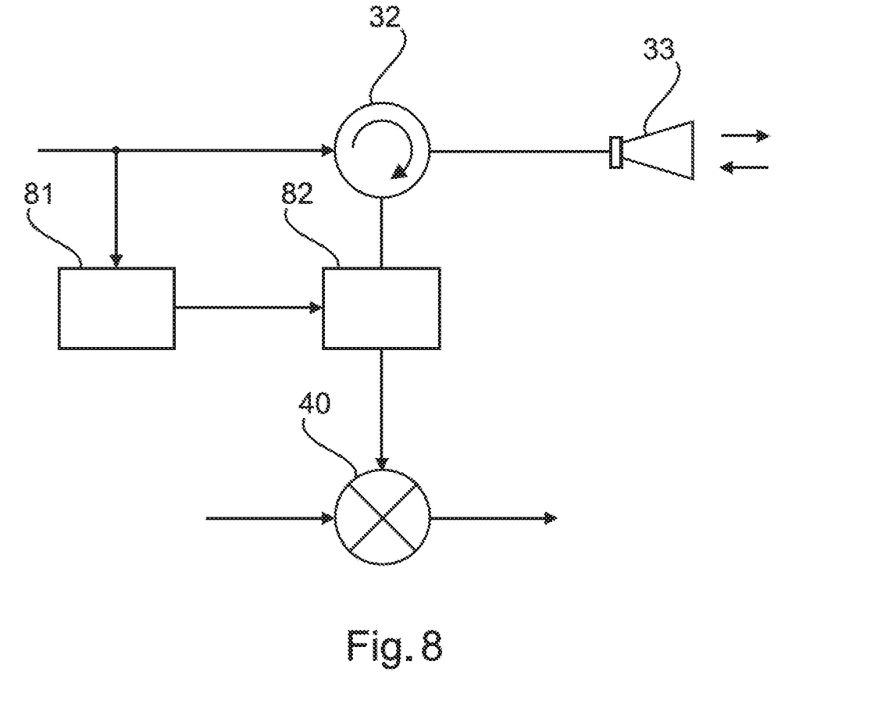
FIG. 8 shows the use of a reference reflection according to another embodiment.

Furthermore, a reference reflection can also advantageously be generated in accordance with the block diagram (in turn shown only in part) according to FIG. 8. In this case, part of the transmission signal branches off at the input of the circulator 32 and is delayed in a defined manner in a delay unit 81, for example by passing through a specific line length. Subsequently, said reference signal arrives at the switching or coupling unit 82. The reception signal coming from the circulator 32 is fed in at a second input of said switching or coupling unit 82. The switching or coupling unit 82 optionally forwards either one of the two input signals or both combined input signals to the mixer 40, where they are converted in terms of the frequency thereof in the manner already described above and further processed. For this purpose, the switching or coupling unit 82 either contains an HF switch or a signal coupler. The advantage of this circuit variant is that, on account of the selectable delay time of the delay unit 81, the reference reflection can be placed at a point on the echo profile at which there is no risk of reflections from measurement objects influencing one another. If the delay unit 81 is additionally provided with defined signal damping, the amplitude of the reference reflection can also be preset to a desired value. Alternatively, in a variation of this variant, it may also be advantageous to incorporate the delay unit 81 in the signal path of the reception signal between the circulator 32 and the switching or coupling unit 82 instead of in the branched-off signal path. As a result, the reference reflection appears as the first echo in the echo profile, before all interfering internal reflections and all measurement reflections received via the antenna.

Figure 9:
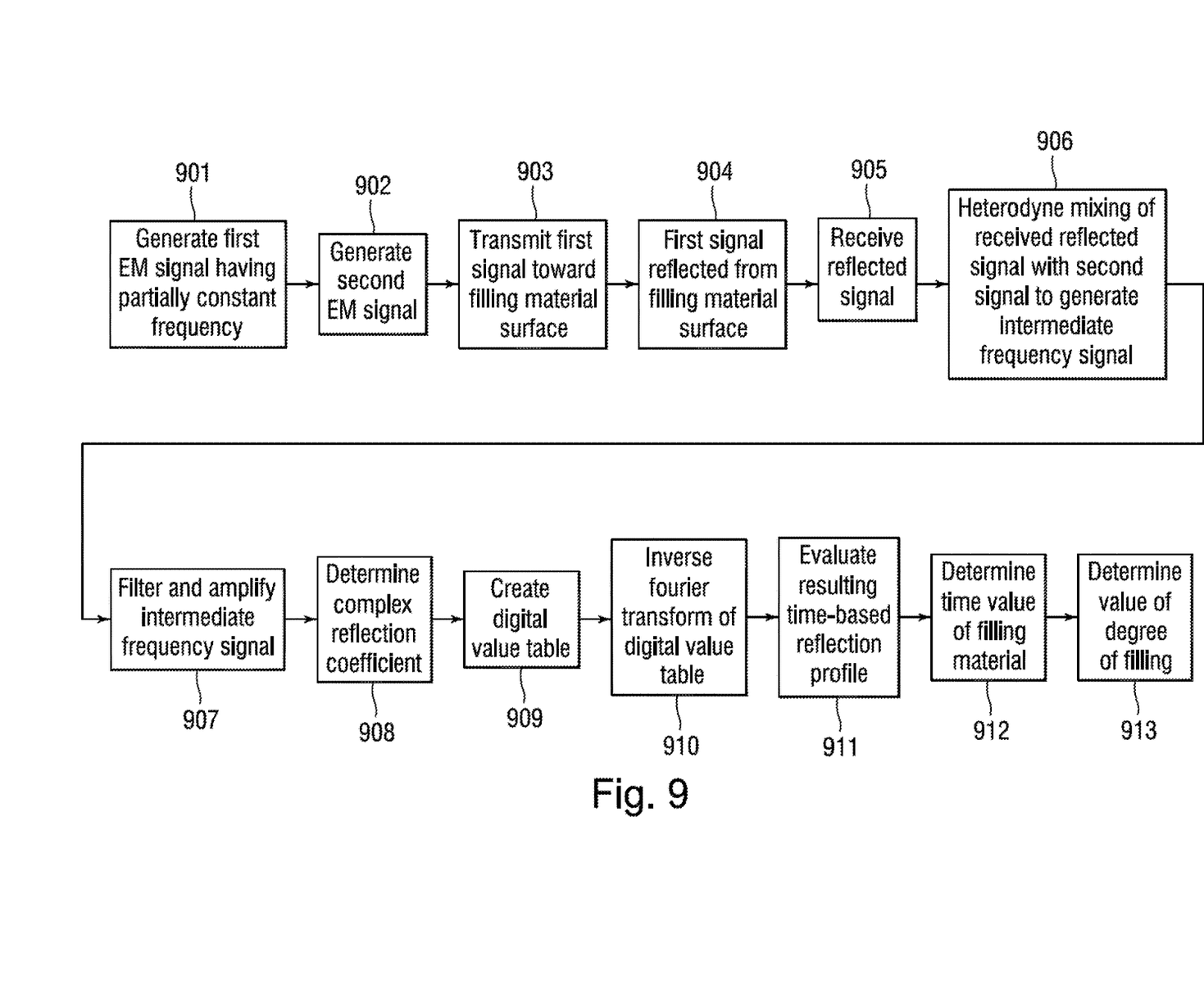
FIG. 9 is a flow chart of a method according to an embodiment.

FIG. 9 is a flow chart of a method according to an embodiment. In step 901, a first electromagnetic signal having a partially constant frequency is generated, the individual frequencies being distributed within a defined frequency band. In step 902 (which as a general rule is carried out simultaneously to step 901) a second electromagnetic signal is generated. Both electromagnetic signals come from at least partially different signal source assemblies. In step 903, the first signal is transmitted towards a filling material surface and in step 904 is reflected on the filling material surface and then received again by the measurement device in step 905. In step 906, the received signal is mixed in a heterodyne manner with the signal generated in step 902 in order to generate an intermediate frequency signal having a uniform frequency that does not depend on the frequency of the first signal. In step 907, the intermediate frequency signal is filtered and amplified in order to suppress interfering signal portions outside the range of the intermediate frequency, and in step 908, a complex reflection coefficient in the form of magnitude and phase or in the form of real and imaginary parts is determined on the basis of the intermediate frequency signal. In step 909, a digital value table consisting of the above-mentioned frequency values and associated complex reflection coefficients is created, and in step 910, said value table is subjected to an inverse Fourier transform in order to be transformed into a corresponding digital value table consisting of time values and associated reflection characteristic values. In step 911, the resulting time-based reflection profile is evaluated in order to identify the reflection of the filling material surface, and in step 912, the time value of the filling material reflection is determined and said time value is converted into a reflector distance on the basis of the previously known wave propagation speed. In step 913, the value of the degree of filling (fill level) is determined from the previously known container height, the distance of the measurement device from the container and the previously determined reflector distance.

Furthermore, a reference reflection can be used to enable correction of the amplitudes and distances of the reflections measured by the antenna.

For the sake of completeness, it should be noted that "comprising" and "having" do not exclude the possibility of other elements or steps, and "one" or "a" do not exclude the possibility of a plurality. It should further be pointed out that features or steps described with reference to one of the above embodiments may also be used in combination with other features or steps of other above-described embodiments. Reference signs in the claims should not be treated as limiting.

We claim:

1. A fill level radar device, configured for a frequency-modulated continuous-wave (FMCW) measuring method, the fill level radar device comprising:
    a first signal source assembly configured to generate a first electromagnetic signal having a stepped linear frequency, individual frequencies being distributed within a defined frequency band;
    a second signal source assembly configured to generate a second electromagnetic signal;
    a transmission assembly configured to transmit the first electromagnetic signal towards a filling material surface and configured to receive the first electromagnetic signal reflected from the filling material surface;
    a mixer arrangement configured to heterodynly mix the received reflected first electromagnetic signal with the second electromagnetic signal in order to create an intermediate frequency signal having a constant frequency that does not depend on the frequency of the first electromagnetic signal; and
    an evaluation circuit configured to determine a fill level from the intermediate frequency signal.

2. The fill level radar device according to claim 1,
    wherein the evaluation circuit comprises a first circuit arrangement configured to determine a complex reflection coefficient from the intermediate frequency signal in the form of magnitude and phase, or real and imaginary parts.

3. The fill level radar device according to claim 1,
wherein the evaluation circuit comprises a second circuit arrangement configured to create a value table from the partially constant frequency of the first signal and associated complex reflection coefficients.

4. The fill level radar device according to claim 3,
wherein the second circuit arrangement is configured to perform an inverse Fourier transform of the value table from the frequency range into the time range and to subsequently determine the fill level from the transformed value table.

5. The fill level radar device according to claim 1,
wherein the second signal source assembly comprises a signal source configured to generate a signal having a constant frequency.

6. The fill level radar device according to claim 1,
wherein the second electromagnetic signal has a partially constant frequency, which frequency has a constant frequency offset to the frequency of the first electromagnetic signal.

7. The fill level radar device according to claim 1,
wherein the individual frequencies of the first electromagnetic signal are equidistant to one another.

8. The fill level radar device according to claim 1, further comprising:
a reference reflector,
wherein the evaluation circuit is further configured to use the first electromagnetic signal reflected on a reference reflector as a time and/or amplitude reference during fill level determination.

9. A method for fill level determination using a frequency-modulated continuous-wave (FMCW) measuring method, the method comprising the following steps:
generating a first electromagnetic signal having a stepped linear frequency, wherein individual frequencies are distributed within a defined frequency band;
generating a second electromagnetic signal;
transmitting the first electromagnetic signal towards a filling material surface and receiving the first electromagnetic signal reflected from the filling material surface;
heterodyne mixing of the received reflected first electromagnetic signal with the second electromagnetic signal in order to create an intermediate frequency signal having a constant frequency that does not depend on the frequency of the first electromagnetic signal; and
determining a fill level from the intermediate frequency signal.

10. A nontransitory computer-readable storage medium having a program stored therein, which, when executed on an evaluation circuit of a fill level radar device, instructs the fill level radar device to perform a method according to claim 9.

* * * * *